US008332356B2

(12) United States Patent
Thergaonkar et al.

(10) Patent No.: US 8,332,356 B2
(45) Date of Patent: Dec. 11, 2012

(54) NFS AGENT UPGRADE

(75) Inventors: Shilpa Thergaonkar, Bangalore (IN); Eunhei Jang, Redwood Shores, CA (US); Anupama Vale, Bangalore (IN)

(73) Assignee: Oracle International Corporation, Redwood Shores, CA (US)

( * ) Notice: Subject to any disclaimer, the term of this patent is extended or adjusted under 35 U.S.C. 154(b) by 357 days.

(21) Appl. No.: 12/464,738

(22) Filed: May 12, 2009

(65) Prior Publication Data

US 2010/0293201 A1 Nov. 18, 2010

(51) Int. Cl.
*G06F 15/177* (2006.01)
*G06F 15/173* (2006.01)

(52) U.S. Cl. ..................... 707/633; 707/634; 717/168

(58) Field of Classification Search .................. None
See application file for complete search history.

(56) References Cited

U.S. PATENT DOCUMENTS

| 6,009,274 | A | 12/1999 | Fletcher et al. | |
|---|---|---|---|---|
| 6,269,456 | B1 | 7/2001 | Hodges et al. | |
| 7,260,818 | B1 | 8/2007 | Iterum et al. | |
| 2006/0048133 | A1 | 3/2006 | Patzachke et al. | |
| 2006/0075001 | A1* | 4/2006 | Canning et al. | 707/203 |
| 2006/0294413 | A1 | 12/2006 | Filz et al. | |
| 2009/0043840 | A1* | 2/2009 | Cherukuri et al. | 709/203 |

OTHER PUBLICATIONS

10g R2 Management Agent Deployment Best Practices, Oracle white paper, Jun. 2006.*
"A Upgrading HipCheck Agents and Clients," HipCheck Installation and User Guide, http://hipcheck.me-inc.com/hipcheck-files/doc/HipCheckUG/upgrade.html, downloaded Dec. 9, 2008, 4 pp.
"Prism Patch Manager,"—Version History, Version 6.4—Release Date: Mar. 27, 2008 http://www.newboundary.com/products/prismpatch/ppm_versionhistory.htm, 3 pp.
"Zero-config Build Cloud," ThoughtWorks Studios, http://studios.thoughtworks.com/cruise-continuous-integration/build-cloud, downloaded Dec. 9, 2008, 2 pp.
"eG Single Agent," eG Innovations, http://www.eginnovations.com/web/egsingleagent.htm, downloaded Dec. 9, 2008, 3 pp.
"Kasersky Administration Kit 6.0 MP1," http://support.kaspersky.com/nl/faq/?qid=208279255, downloaded Dec. 9, 2008, 2 pp.

(Continued)

*Primary Examiner* — Vei-Chung Liang
*Assistant Examiner* — Miranda Huang
(74) *Attorney, Agent, or Firm* — Kilpatrick Townsend & Stockton LLP

(57) ABSTRACT

A networked system includes a master agent and at least one state agent. When upgrading the software of the master agent and the state agents, only the binary files at a shared location at the master agent are changed. To accomplish the change, a watchdog process at the state agent watches for the presence of a marker file at the master agent. The master agent produces the marker file if the master agent will accomplish a software upgrade. When the marker file is present, the state agent stops execution. The watchdog continues to monitor the presence of the marker file until the marker file is deleted at the end of the installation process. When the marker file is deleted, the state agent installs the new binary files associated with the software upgrade and resumes execution.

14 Claims, 6 Drawing Sheets

OTHER PUBLICATIONS

Senicka, Jim et al., "Whitepaper: VCS 4.0 Agent Development by Example," VERITAS Software Corporation, http://eval.symantec.com/mktginfo/products/White_Papers/High_Availability/agent_dev_by_example.pdf, Nov. 2004, 79 pp.

"Chapter 8 Upgrading Sun Cluster Software," Sun Cluster Software Installation Guide for OS, Sun Microsystems, http://docs.sun.com/app/docs/doc/819-2970/z400004f1003552?a=view, downloaded Dec. 9, 2008, 49 pp.

Oracle Enterprise Manager, Grid Control Support Notes for Linux and Microsoft Windows, 10g Release 4 (10.2.0.4.0), E-10553-01, http://otndnld.oracle.co.jp/document/products/oem10/1020/linux_win/E10553_01.pdf, Oct. 2007, 26 pp.

Kolam, Hariharan, "Applications and Enhancements of Featherweight Virtual Machine (FVM)," Stony Brook University, http://www.ecsl.cs.sunysb.edu/tr/fvmThesis.pdf, May 2008, 36 pp.

* cited by examiner

NFS AGENT UPGRADE

BACKGROUND

Upgrading software is important to maintain efficiency and effectiveness in many computer systems. However, upgrading the same software used at several computers across an organization can be very difficult. Each computer system can require a separate installation with custom changes to adjust to particulars of the computer system. This installation may require not only the storing of the software at the local computer system but a specifically designed configuration to execute the software. The differences in the software across multiple systems can create configuration discrepancies between systems in the organization. Further, separate software installation can also be time-consuming for technical staff and installers.

BRIEF SUMMARY

Embodiments of the present disclosure address these and other problems. A networked system includes a master agent and at least one state agent. The state agent is a remotely located instantiation of the master agent. In other words, the master agent may execute on a first computer system and the state agent can execute on a second computer system. Further, the first and second computer systems can be remotely located, such as across the country from each other. The state agent can share binary files with the master agent because the master agent provides the binary files at a shared location and allows the state agent to instantiate using the binary files from the shared location. Thus, the state agent will not have a local copy of the binary files but load the binary files from the shared location.

When upgrading the software of the master agent and the state agent, the binary files at the shared location and the configuration files at both the master agent and the state agent may be changed. To accomplish the change, a watchdog process at the state agent watches for the presence of a marker file at the master agent. The master agent produces the marker file if the master agent will accomplish a software upgrade. When the marker file is present, the state agent stops execution. The state agent needs to stop execution so that the state agent does not execute using binary files that may be in an inconsistent state. The watchdog continues to monitor the presence of the marker file until the marker file is deleted at the end of the installation process. When the marker file is deleted, the state agent begins execution again using the new binary files associated with the software upgrade.

BRIEF DESCRIPTION OF THE DRAWINGS

The present disclosure is described in conjunction with the appended figures.

DETAILED DESCRIPTION

Figure 1:
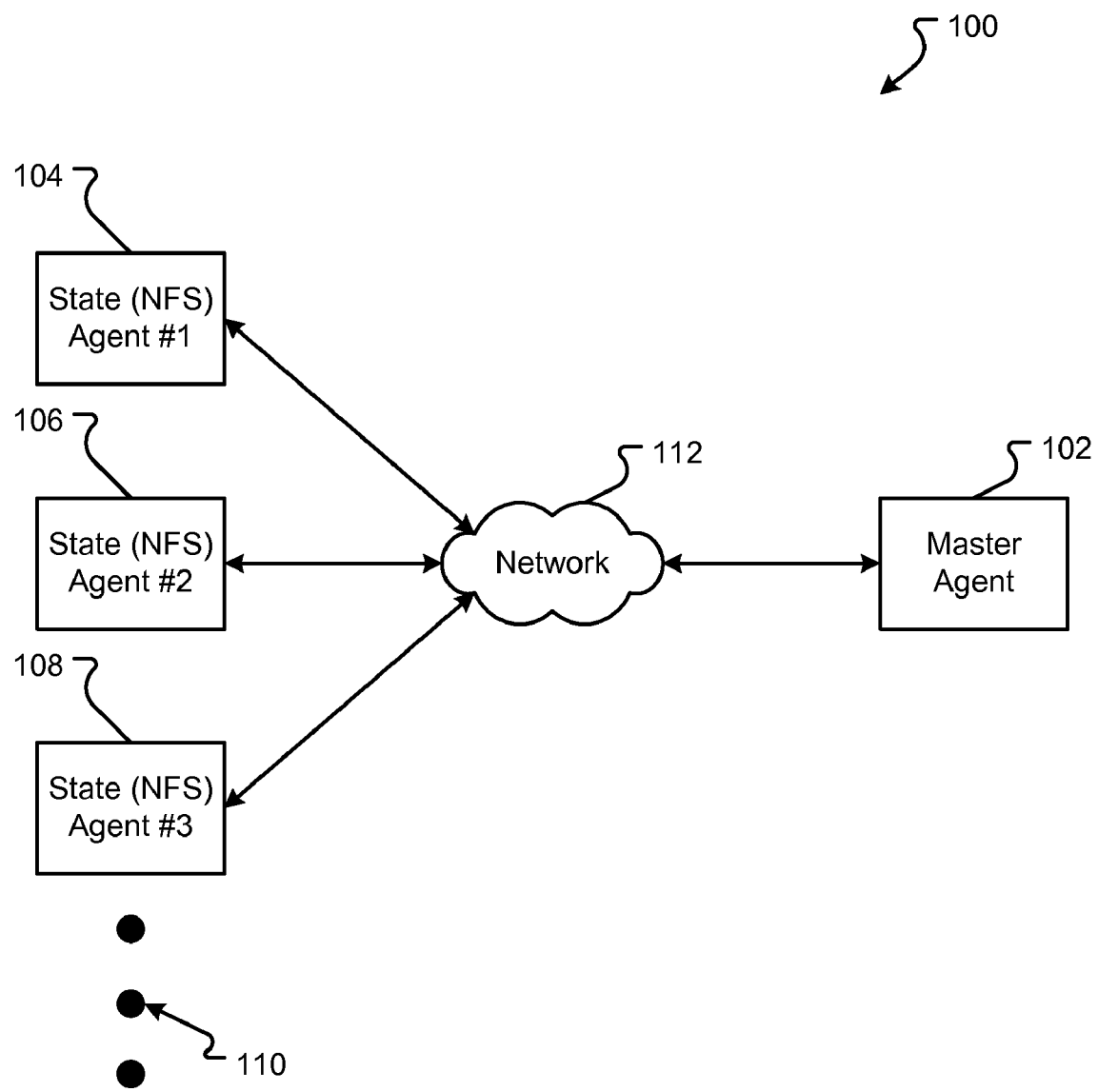
FIG. 1 is a block diagram of an embodiment of a system operable to upgrade software at a state agent.

In the appended figures, similar components and/or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

Embodiments of the disclosure generally relate to systems and methods for upgrading software over a distributed computing environment. Generally, the system includes a master agent and at least one state agent. A master agent is a computing system executing a version of the software. The master agent comprises the binaries for the agent. The binary files are stored at a shared location. The state agent is also an agent that functions the same as the master agent. However, the state agent executes on another computer system, which can be remotely located. Remotely located can mean executing on a different computing system whether that computer system is in the same geographic location (the same facility) or in another geographic location. A state agent can install and/or execute the binary files from the shared location. Thus, the state agent may not store the binary files at the remotely located computer system. Having the binaries located in a single shared location ensures common function and configuration between the master agent and the state agent. Controlling the configuration between the master agent and state agent becomes increasingly difficult as more state agents are added to the system. There can be several state agents, each executing remotely on different computer systems.

To effect a software change or upgrade in the system, the software at the shared location at the master agent is changed. However, to change the software at the one or more state agents, the state agents need to be stopped and re-executed with the new software. To notify the state agents that a software upgrade is being completed, the master agent generates a marker file. Each state agent includes a watchdog process that periodically scans for the marker file. If the watchdog discovers the marker file, the watchdog stops the execution of the state agent. When the installation of the software is complete, the master agent deletes the marker file. The watchdog can discover that the marker file is no longer present at the master agent. The watchdog can then initiate and complete instantiation of the new state agent.

To ensure the proper configuration, a script file may be created with the software installation. The script file scripts change to the configuration file at each state agent. After determining the absence of the marker file, the watchdog can determine if a script file is present for the software upgrade. If the script file is present, the watchdog loads and executes the script file. The script file can change the configuration file of the state agent to ensure proper execution of the software upgrade. The state agent is then instantiated from the upgraded software at the shared location as directed by the configuration file. After instantiation, the state agent can be executed. This software upgrade system allows only one copy of software to be upgraded while allowing separate configurations for each state agent. Thus, the systems and methods provide an auto-upgrade of the software for all agents, whether a master agent or a state agent, even when the state agents are executed at different physical locations.

Specific details are given in the following description to provide a thorough understanding of the embodiments. However, it will be understood by one of ordinary skill in the art that the embodiments may be practiced without these specific details. For example, circuits may be shown in block diagrams in order not to obscure the embodiments in unnecessary detail. In other instances, well-known circuits, processes, algorithms, structures, and techniques may be shown without unnecessary detail in order to avoid obscuring the embodiments. In some embodiments, a computing system may be used to execute any of the tasks or operations described herein. In embodiments, a computing system includes memory and a processor and is operable to execute computer-executable instructions, stored on a computer-readable medium, that define processes or operations described herein.

Also, it is noted that the embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Moreover, as disclosed herein, the term "computer-readable medium" or "storage medium" may represent one or more devices for storing data, including read-only memory (ROM), random access memory (RAM), magnetic RAM, core memory, magnetic disk storage mediums, optical storage mediums, flash memory devices and/or other machine readable mediums for storing information. The term "machine-readable medium" includes, but is not limited to, portable or fixed storage devices, optical storage devices, wireless channels and various other mediums capable of storing, containing or carrying instruction(s) and/or data.

Embodiments may be implemented by hardware, software, firmware, middleware, microcode, hardware description languages, or any combination thereof. When implemented in software, firmware, middleware or microcode, the program code or code segments to perform the necessary tasks may be stored in a machine-readable medium such as storage medium. A processor(s) may perform the necessary tasks. A code segment may represent a procedure, a function, a subprogram, a program, a routine, a subroutine, a module, an object, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

An embodiments of a system 100 for updating or upgrading software is shown in FIG. 1. The system includes a master agent 102 in communication with at least one state agent 104, 106, or 108. The master agent 102 is a software process executing on a computer system, such as the computer systems described in conjunction with FIG. 7. The software process can be an agent of an enterprise management application, for example, Oracle Enterprise Management application offered by Oracle Corporation. An agent in an enterprise management application monitors the function of software application executing on the local computer system. The gathered information can be reported to information technology personnel to improve the function of the computer system. In an embodiment, the master agent 102 monitors the Network File System (NFS) of the computer system where the master agent 102 is executed.

Similar to the master agent 102, the state agents 104, 106, and/or 108 can be agents in an enterprise management application that monitor the NFS. As such, the state agents 104, 106, or 108 may be referred to as NFS agents. Each state agent 104, 106, or 108 is another instantiation of the agent executing on a separate computer system. The computer systems may be remotely located from the computer system executing the master agent 102 or the other state agents 104, 106, or 108. Remotely located or remote location can mean a separate computer system or a computer system in a geographically remote and different location. There may be more or fewer state agents than those shown in FIG. 1 as represented by the ellipses 110.

The state agents 104, 106, and/or 108 communicate with the master agent 102 through a network 112. The network 112 can be any private or public network, such as a local area network (LAN), a wide area network (WAN), a wireless LAN, the Internet, etc. The network 112 can include any equipment or systems, e.g., routers, transceivers, etc., operable to and/or configured to transmit data from one computer system to another computer system. The systems of the network 112 can use any protocol, format, or software to transmit the data, such as TCP/IP, SOAP, etc.

Figure 2:
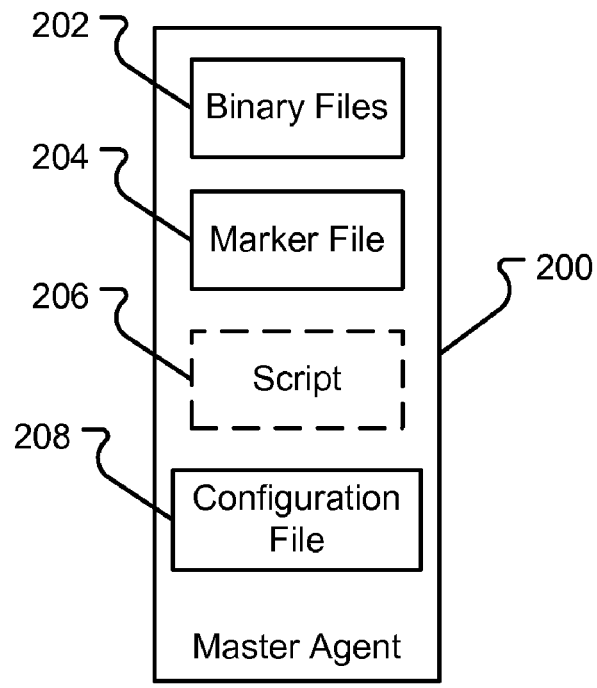
FIG. 2 is a hardware and/or software block diagram of an embodiment of a master agent.

An embodiment of a master agent 200 is shown in FIG. 2. The master agent 200 can be the same or similar to master agent 102 (FIG. 1). A master agent 200 can include one or more software components, objects, and/or modules. For example, the master agent 200 can include one or more binary files 202, a marker file 204, a script 206, and/or a configuration file 208. The binary files 202 are the binary code installed to instantiate an instance of the master agent 200. The binary code 202 may have been developed from a software development language, e.g. C++, Assembler, Visual Basic, and compiled into the binary files. The binary files 202 define the function and execution of the master agent 200. The binary files 202 may be stored in a shared location. A shared location is a predetermined location in the computer system (e.g., predetermined hardware device, file directory, folder, etc.). In embodiments, the master agent 200 can receive an update, upgrade, or change to the binary files and store the change to the shared location. At some time thereafter, the master agent 200 can install the new binary files 202.

The marker file 204 is a software file generated when an upgrade, update, or change to the binary files 202 is to be made. The marker file 204 can be a bit flag, a complete application file, or other software construct that is generated and stored in a predetermined location. The master agent 200 can automatically generate the marker file 204 upon receiving the change to the binary files 202. When the installation of the new binary files is completed, the master agent 200 can automatically delete the marker file 204.

The script 206 is a set of instructions that can direct a change to a configuration file, such as configuration file 208, state agent, or master agent 200. The script 206 may be received when receiving the changes to the binary files 202 or may be automatically generated by the master agent 200 in response to action conducted on the binary files 202. For example, the script 206 can change the location identifier for the binary files 202 in the configuration file if the updated binary files 202 are stored in a new location. Other instructions written into the script 206 will be evident from the explanation to follow with respect to updating the binary files 202.

The configuration file 208 is a data structure containing the data defining the configuration of the master agent 200 and/or computer system executing the master agent 200. An exemplary configuration file 208 is described in conjunction with FIG. 4. It should be noted that each agent can contain a separate and unique copy of a configuration file. As such, each agent and computer system can be configured differently.

Figure 3:
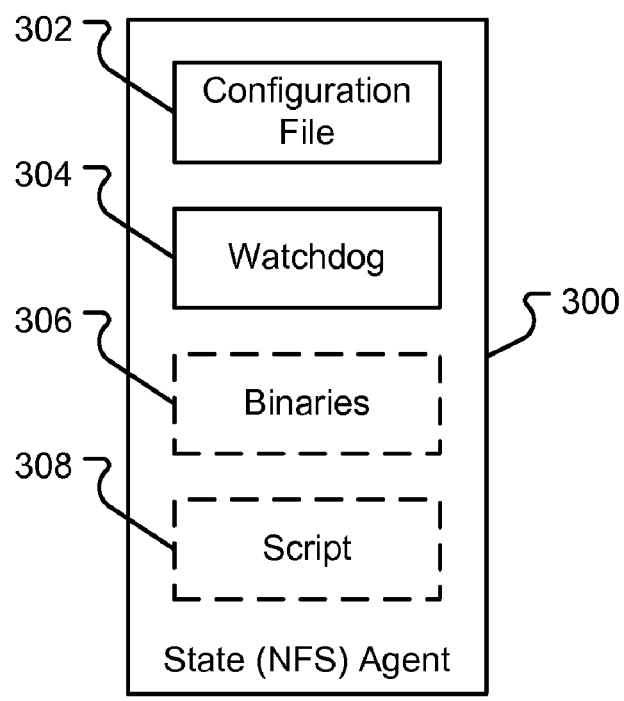
FIG. 3 is a hardware and/or software block diagram of an embodiment of a state agent.

An embodiment of a state agent 300 is shown in FIG. 3. The state agent 300 may be the same or similar to state agents 104, 106, or 108 (FIG. 1). The state agent 300, similar to the master agent 200 (FIG. 2), can include one or more software components, objects, and/or modules. The state agent 300 can include a configuration file 302, a watchdog process 304, an instantiation of the one or more binary files 202, and/or an execution of a script 206. The configuration file 302, similar to configuration file 208 (FIG. 2), is also a data structure containing the data defining the configuration of the state agent 300 and/or computer system executing the state agent 300. An exemplary configuration file 302 is described in conjunction with FIG. 4. It should be noted that each state agent can contain a separate and unique copy of a configuration file 302. As such, each state agent 300 agent and computer system can be configured differently.

A watchdog process 304 is a separate executable software application that continually and periodically scans the master agent 200 (FIG. 2) for the presence or absence of the marker file 204. The watchdog process, or simply watchdog, 304 periodically polls or accesses a predetermined location in the master agent 200 (FIG. 2) to check for the marker file 204 (FIG. 2). The watchdog 304 periodically scans the marker file location by checking the location, then pausing or waiting for a predetermined period of time before rechecking the predetermined location. The duration of the wait period can be configurable or preset and may be ten (10) seconds, several minutes, or any measure of time. The master agent 200 may also include a watchdog process 304 as both the master agent 200 and the state agent 300 execute from the same binary files and are, therefore, necessarily the same.

The predetermined location may be identified in the configuration file 302. In other embodiments, the marker file 204 (FIG. 2) is always stored in a set location hardcoded into and known by the watchdog 304. If a marker file 204 (FIG. 2) is present, the watchdog can stop the execution of the state agent 300. The watchdog 304 can continue to monitor the presence of the marker file 204 (FIG. 2) to know when the marker file 204 (FIG. 2) is deleted. In response to deleting or absence of the marker file 204 (FIG. 2), the watchdog 304 can direct the migration to the changed binary files 202 (FIG. 2) located at the master agent 200 (FIG. 2). Upon installation of the new binary files 202 (FIG. 2), the watchdog 304 can restart or instantiate a new instance of the state agent 300. Thus, the state agent 300 executes with the new binary files after the master agent 200 (FIG. 2) installs the new binary files.

FIG. 3 shows the binary files 306 in a dashed box. The dashed box represents that the binary files 306 are not stored at the state agent 300 but shared by the state agent 300, from the shared location in the master agent 200 (FIG. 2). Thus, an instance of the binary files 306 is instantiated as the state agent 300. Thus, the binary files 306 are the binary code instantiated as an instance of the state agent 300. The binary files 306 define the function and execution of the state agent 300. The binary files 306 may be read from the shared location by the state agent 300. The shared location is at the master agent 200 (FIG. 2) as described in conjunction with FIG. 2.

The script 308 is also shown in a dashed box in FIG. 3. The dashed box represents that the script 308 is also not stored at the state agent 300 but is executed at the state agent 300 to change the state agent 300 before installation and/or instantiation of new binary files 306. The script 308 can be a set of instructions that can direct the change of the configuration file 302 or other characteristic of the state agent 300. Before installing new binary files 306 or restarting the state agent 300, the watchdog 304 may determine if a script file 206 (FIG. 2) is present at the master agent 200 (FIG. 2). In embodiments, the script 206 (FIG. 2) is stored in a predetermined location known by the watchdog 304. If a script is present, the watchdog 304 can load the script 308 and execute the script 308 to change the state agent 300.

It should be noted that each configuration file 302 can be different for each different state agent 300. Thus, a first state agent can have a first configuration file and a second state agent can have a second configuration file. Further, the first configuration file can be different from the second configuration file. However, the single script 206 (FIG. 2) can change both the first configuration file and the second configuration file. The script 206 (FIG. 2), thus, may preserve unique information in each configuration file while changing common and shared information that applies to the change to the binary files 202.

Figure 4:
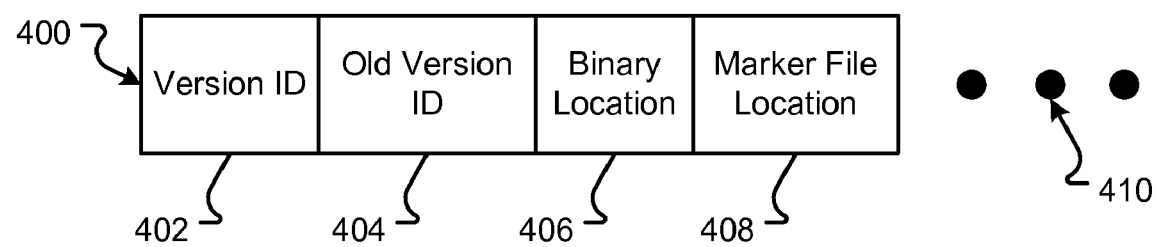
FIG. 4 is a block diagram of an embodiment of a data structure for a configuration file.

An embodiment of a data structure 400 representing a configuration file is shown in FIG. 4. The configuration file 400 can be the same or similar to configuration file 208 (FIG. 2) or 302 (FIG. 3). The configuration file 400 can comprise one or more data fields including one or more of, but not limited to, a version identifier (ID) 402, an old version ID 404, a binary location 406, and/or a marker file location 408. The configuration file 400 can include more or fewer fields than those shown in FIG. 4, as represented by the ellipses 410. It should be noted that the numeric identifiers used herein may be used interchangeably to identify the data field or the data stored in the data field. A configuration file 400 can contain information specific to the host computer system executing the agent.

The version ID field 402 contains an identifier for the current version of the binary files 202 (FIG. 2). For example, the software of the binary files 202 (FIG. 2) can have a current version of 11.1. This version may be identified with an identifier, such as a globally unique identifier (GUID), alphanumeric ID, code, etc. The old version ID field 404 can include a similar identifier but for the last version of the software. As such, when the software of the binary files is updated, the current version ID 402 is copied and stored as the old version ID 404; then a new version ID 402 is stored in the version ID field 402.

The binary location field 406 stores the shared location for the binary files 202 (FIG. 2) at the master agent 200 (FIG. 2). As explained in conjunction with FIG. 2, the shared location can be identified by a storage device, directory, one or more folders in a folder hierarchy, etc. This location can be stored in the binary location field 406. The state agent 300 (FIG. 3) can read the binary location field 406 to determine from which location to load or read the binary files 202 (FIG. 2). The marker file location field 408 serves a similar function to the binary location field 406 in that the marker file location field 408 identifies the location from which the watchdog 304 can scan for the marker file 204. The marker file location 408 can also be identified by a storage device, directory, one or more folders in a folder hierarchy, etc. The configuration file 400 can include other information specific to the host computer system including one or more of, but not limited to, the host name, the port where an agent is executing, etc.

Figure 5:
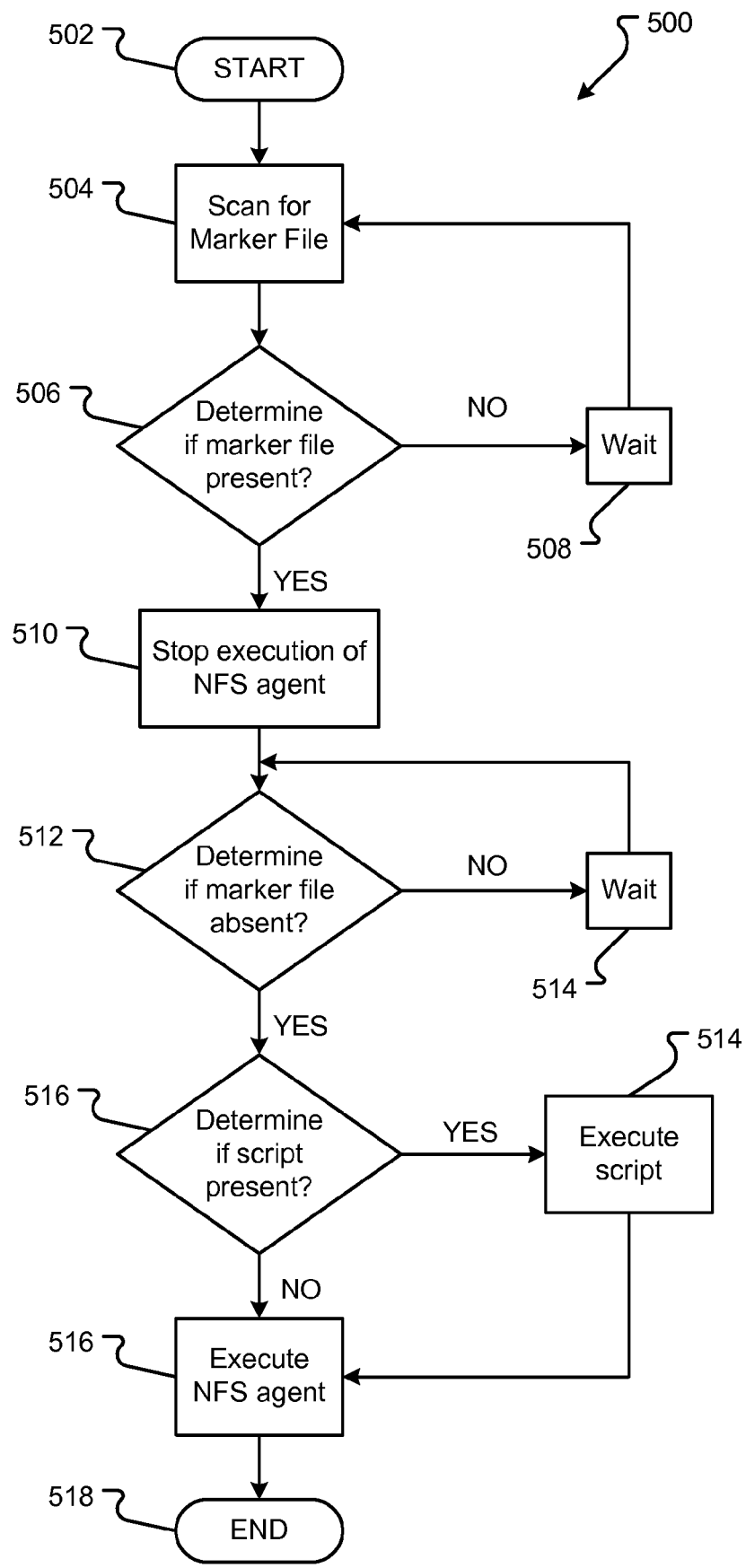
FIG. 5 is a flow diagram of an embodiment of a process for upgrading the software of a state agent.

An embodiment of a method 500 for updating, upgrading, or changing software at a state agent 300 (FIG. 3) is shown in FIG. 5. In embodiments, the method 500 generally begins with a START operation 502 and terminates with an END operation 518. The steps shown in the method 500 may be executed in a computer system as a set of computer-executable instructions. While a logical order is shown in FIG. 5, the steps shown or described can, in some circumstances, be executed in a different order than presented herein. Further, the steps shown in FIG. 5 may only be a subset or may be substituted for other steps not shown in FIG. 5. The method 500 of FIG. 5 will be explained with reference to the drawings in FIGS. 1-4.

The current instantiation of the state agent 300 is presumed to be executing. The watchdog 304 scans the master agent 200 for the presence of the marker file 204 in step 504. The watchdog 304 can determine a predetermined location for the marker file 204 from the configuration file 302. The predetermined location may be stored in the marker file location field 408 of the configuration file 400. The watchdog 304 may check for a flag representing the marker file 204 or may scan a directory in the master agent 200 to determine if a file is present in step 506. If any file is present in the directory, the watchdog 304 assumes the file is the marker file 204. If the marker file 204 is not present, the method 500 flows NO to wait for a predetermined amount of time in step 508. After waiting for the predetermined amount of time, e.g., thirty (30) seconds, the watchdog 304 scans again for the marker file 204 in step 504. If the watchdog 304 does determine that the marker file 204 is present, the method 500 flows YES to stop the execution of the state agent 300 in step 510.

The state agent 300 can stop execution by stopping all processes functioning according to the existing binary fields 306. Data or states may be saved or preserved. During and after the state agent 300 stops functioning, the watchdog 304 continues to monitor the presence of marker file 204. However, in this situation, the watchdog 304 determines if the marker file 204 is still present or absent in step 512. If the marker file 204 is still present or not absent, the method 500 flows NO where the watchdog 304 waits for a predetermined amount of time in step 514. After waiting for the predetermined amount of time, e.g., thirty (30) seconds, the watchdog 304 scans again for the marker file 204. If the watchdog 304 does determine that the marker file 204 is now absent, the method 500 flows YES to determine if a script file 206 is present at the master agent 200 in step 516. A script file 206 may be produced for some changes to the binary files 202 but not necessarily all changes.

The watchdog 304 can scan the master agent 200 in a predetermined location for the presence of a script file 206. For example, the watchdog 304 may look if a file is present in a directory for script files. If the watchdog 304 determines that a script file 206 is present, the watchdog 304 can load and execute the script in step 514. The script file 308 can change the state agent 300, such as changing the configuration file 302. For example, the script can copy the version ID 402 into the old version ID field 404. Further, the shared location for binary files 202 may change and can be written into the binary location field 406. After the execution of the script 308 or if is no script file 206 is present in the master agent 200, the method 500 flows NO to execute the state agent 200 in step 516. In embodiments, a new instance of the state agent 200 is started by instantiating with and then executing the new binary files 202 from the shared location. The shared location may be different from a previous shared location and defined by the configuration file 302 modified by an executed script 308.

Figure 6:
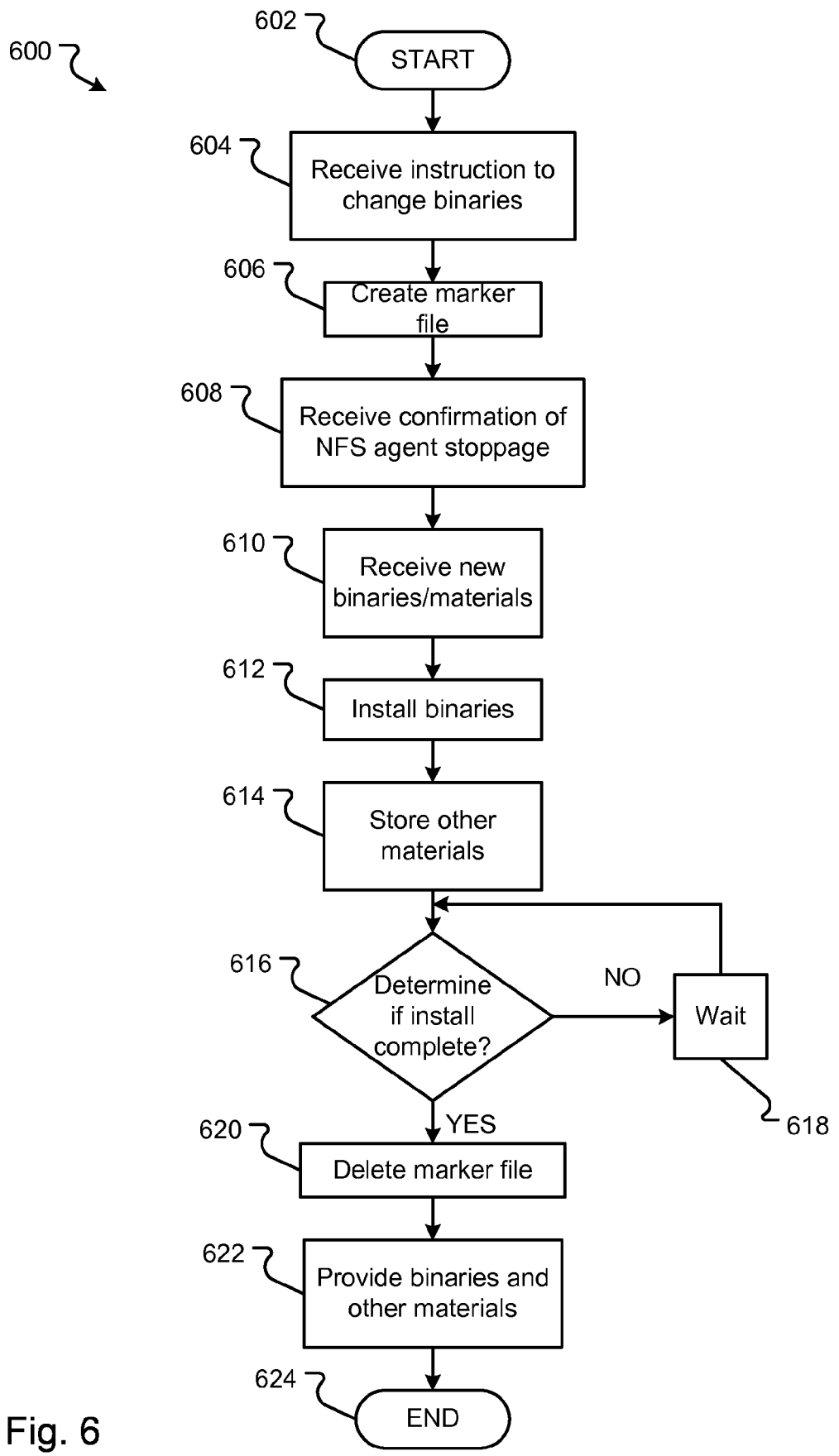
FIG. 6 is a flow diagram of an embodiment of a process for upgrading the software of a state agent from a master agent.

An embodiment of a method 600 for updating, upgrading, or changing software at a master agent 200 (FIG. 2) is shown in FIG. 6. In embodiments, the method 600 generally begins with a START operation 602 and terminates with an END operation 624. The steps shown in the method 600 may be executed in a computer system as a set of computer-executable instructions. While a logical order is shown in FIG. 6, the steps shown or described can, in some circumstances, be executed in a different order than presented herein. Further, the steps shown in FIG. 6 may only be a subset or may be substituted for other steps not shown in FIG. 6. The method 600 of FIG. 6 will be explained with reference to the drawings in FIGS. 1-4.

The current instantiation of the master agent 200 is presumed to be executing. The master agent 200 receives instructions to change the binary files 202, as in a software upgrade, in step 604. The master agent 200 can undergo an upgrade process or other function to receive the instruction to change the binary files 202. In response to receiving the instruction, the master agent 200 can automatically create a marker file 204 in a predetermined location in step 606. Creation of the marker file 204 publishes the existence of a software upgrade or change to the binary files 202 for the state agents 300. The predetermined location for the marker file 204 may be defined from the configuration file 208 or hardcoded and known by the master agent 200. For example, the predetermined location for the marker file 204 may be stored in the marker file location field 408 of the configuration file 400.

Optionally, after each state agent 300 determines the presence of the marker file 204, the state agents send a confirmation to the master agent 200. The master agent 200 can receive the confirmation messages of the stoppage of each state agent in step 608. The master agent 200 may then check that all state agents have stopped by correlating a confirmation message with each known state agent 300. If one or more state agents 300 do not send a confirmation, the master agent 200 may wait until the state agent 300 responds. As such, divergent configurations do not occur between the master agent 200 and the various state agents 300.

The master agent 200 can then receive the new binary files or other materials in step 610. The new binary files 202 may be stored in the existing shared location or in a new location, which will become the new shared location. The state agent 300 will now use the binary files 202 from the shared location to instantiate and execute. In other embodiments, the master agent 200 writes the new binary files 202 over the existing binary files. The other materials can include a new configuration file 208 and/or a script 206 if a script is provided with the new binary files 202. Each state agent 300 can use the new script to change the configuration file 302 at the state agent 300. The master agent 200 can then install the new binary files 202 in step 612. The change or software upgrade of the binary files 202 may change only a portion of the possible binary files. At this point, the master agent 200 is executing according to the changed software. If other materials were received, the materials, such as the script 206, are stored in step 614. The script 206 can be stored in a predetermined location or a new location directed by the script 206 or the new configuration file 208.

The master agent 200 can then determine if the installation is complete in step 616. The master agent 200 may ensure that all instructions for the installation are complete or that the script 206 has been completed. If the installation is not complete, the method 600 flows NO to wait for a predetermined amount of time in step 618. After waiting for the predetermined amount of time, e.g., thirty (30) seconds, the master agent 200 may again determine if the installation is complete. If the master agent 200 does determine that the installation is complete, the method 600 flows YES where the master agent 200 deletes the marker file 204 in step 620.

The state agent 300 can recognize the absence of the marker file 204 and request the binaries and any script 206 or other materials. The master agent 200 can provide the binary files 202, script 206, or other materials in step 622. In embodiments, the master agent 200 creates a data packet and transmits the information to the several state agents 300. However, the master agent 200 may also just provide access to the several state agents 300 to copy the binary files 202 and/or other materials.

Figure 7:
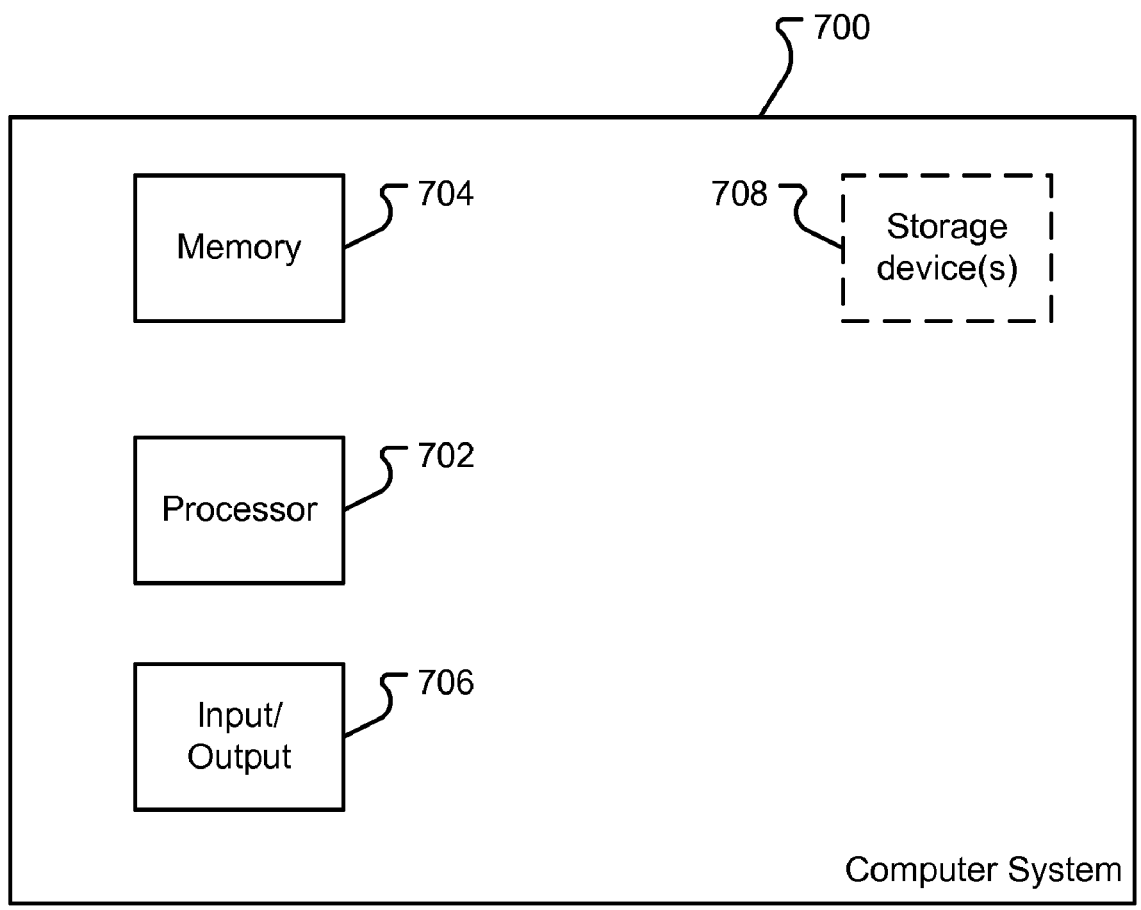
FIG. 7 is a block diagram of an embodiment of a computer system for use in the system for authorizing contactless payments.

Embodiments of the different systems represented in this disclosure, which may include the master agent 200 or state agent 300, may be a computer system, such as computer system 700 shown in FIG. 7. A basic computer system is shown, and one skilled in the art will recognize the technical changes and modifications that may be required to make the systems described herein operable. The computer system 700 comprises a processor 702, which completes the operations described in conjunction with FIGS. 5 through 6 or makes the systems operable described in conjunction with FIGS. 1 through 3. Further, the computer system 700 can execute functions in response to receiving the data structures described in FIG. 4. The processor 702 may be any type of processor operable to complete the operations or implement the systems described herein. For example, the processor 702 may be an Intel Pentium processor, an ASIC, an FPGA, or other device.

The computer system 700 also comprises memory 704 to hold data or code being executed by processor 702. The memory 704 may permanently or temporarily store the instructions described in conjunction with FIGS. 5 through 6 or the data elements described in conjunction with FIG. 4. Memory may be classified as a computer-readable medium, for example, RAM, ROM, magnetic media, optical media, etc.

The computer system 700 also can comprise software elements, including an operating system and/or other code, such as one or more application programs for upgrading software at the master agent 200 and/or the state agents 300. The application programs may comprise computer programs described herein, and/or may be designed to implement methods described herein and/or configure systems described herein. Merely by way of example, one or more procedures described with respect to the method(s) discussed in conjunction with FIGS. 5-6 might be implemented as code and/or instructions executable by the computer system 700 (and/or the processor 702 within the computer 700).

A set of these instructions and/or code might be stored on a computer-readable storage medium, such as the storage device(s) 708 or memory 704. In some cases, the storage medium might be incorporated within a computer system. In other embodiments, the storage medium might be separate from a computer system (i.e., a removable medium, such as a compact disc, etc.), and/or provided in an installation package, such that the storage medium can be used to program a general purpose computer with the instructions/code stored thereon. These instructions might take the form of executable code, which is executable by the computer system 700 and/or might take the form of source and/or installable code, which, upon compilation and/or installation on the computer system 700 (e.g., using any of a variety of generally available compilers, installation programs, compression/decompression utilities, etc.), then takes the form of executable code.

Further embodiments of the computer system 700 comprise input/output (I/O) modules of systems 706. I/O systems 706 may include displays such as LCDs, plasma screen, cathode ray tubes, etc. The displays can provide a visual representation of data to a user. I/O system 706 may also include input devices such as mice, keyboards, touch screens, etc. Input devices allow the user to input information into the computer system. I/O systems 706 may also comprise communication systems such as wired, wireless, or other communication systems. Further, communication systems may communicate with peripheral devices, such as printers, modems, or other devices.

In light of the above description, a number of advantages of the present invention are readily apparent. For example, rather than the state agent 300 polling the master agent 200 for the presence or absence of the marker file 202, the master agent 200 can broadcast a notification of the software upgrade commencement and termination. Further, the shared location for the binary files 202 and/or script 206 may be in a separate location from, but under the control of, the master agent 200. Other changes are possible and contemplated without deviating from the spirit and scope of the attached claims.

Embodiments disclosed herein provide a simple and efficient method for updating software across multiple computer systems. The amount of message traffic is reduced by not including confirmation messages but allowing each state agent to function independently to change the software. Thus, the user can change one copy of binary files but effect a software upgrade across multiple systems. Further, each state agent can maintain a unique configuration but have a single script distributed during upgrades to change common configuration data.

It will be apparent to those skilled in the art that substantial variations may be made in accordance with specific requirements. For example, customized hardware might also be used, and/or particular elements might be implemented in hardware, software (including portable software, such as applets, etc.), or both. Further, connection to other computing devices such as network input/output devices may be employed.

While the principles of the invention have been described above in connection with specific apparatuses and methods, it is to be clearly understood that this description is made only by way of example and not as limitation on the scope of the invention.

What is claimed is:

1. A system for updating software, the system comprising:
a master agent computer, the master agent computer comprising a binary file stored at a shared location;
a state agent computer of a plurality of state agent computers in communication with the master agent computer, wherein the state agent computer is at a remote location and wherein the state agent computer is operable to use the binary file from the shared location for execution, wherein the plurality of state agent computers are running at different physical locations;
wherein the master agent computer is operable to receive a new binary file to update the binary file at the shared location, and in response to receiving the new binary file the master agent computer creates a marker file;
wherein the state agent computer comprises a watchdog configured to monitor the master agent computer for the presence of the marker file;

wherein, in response to the marker file being present at the master agent computer, execution of the state agent computer is stopped;

wherein the master agent computer is operable to install the new binary file and in response to installing the new binary file, the master agent computer deletes the marker file;

wherein the watchdog waits for a predetermined period of time, and then checks for the marker file, and in response to the marker file being deleted, restarts the state agent computer;

wherein, upon restarting, the state agent computer installs instantiates the new binary file at the state agent computer;

wherein only one copy of the new binary file is allowed to be upgraded, whereas separate configurations of the new binary file are allowed for each of the plurality of state agent computers;

wherein each of the plurality of state agent computers and the master agent computer are provided with an auto-upgrade even when the plurality of state agent computers are running on different physical locations;

a second state agent computer;

wherein the state agent computer comprises a first configuration file;

wherein the second state agent computer comprises a second configuration file;

wherein the first configuration file is different from the second configuration file; and wherein the master agent computer comprises a script file, wherein, upon restart of the state agent computer and the second state agent computer, the script file modifies the first configuration file and the second configuration file.

2. The system as defined in claim 1, wherein, if no marker file is present, the watchdog is operable to pause before monitoring for the marker file again.

3. The system as defined in claim 2, wherein the master agent computer further comprises a script file, wherein the script file scripts a change to the state agent computer upon restart.

4. The system as defined in claim 3, wherein, upon restart of the state agent computer, the state agent computer is operable to check for the script file and operable to execute the script file to change the state agent computer.

5. The system as defined in claim 4, wherein the state agent computer further comprises a configuration file, wherein the script changes the configuration file.

6. A method for modifying a state agent of multiple state agents, the method comprising:

storing, at a shared location, a master agent computer comprising a binary file;

a state agent computer of a plurality of state agent computers, communicating with the master agent computer, wherein the state agent computer is at a remote location and wherein the state agent computer is operable to use the binary file from the shared location for execution, wherein the plurality of state agent computers are running at different physical locations;

receiving, by the master agent computer, a new binary file to update the binary file at the shared location;

in response to receiving the new binary file, creating a marker file by the master agent computer;

monitoring, by a watchdog comprised on the state agent computer, the master agent computer for the presence of the marker file;

in response to the marker file being present at the master agent computer, stopping execution of the state agent computer;

installing, by the master agent computer, the new binary file;

in response to installing the new binary file, deleting, by the master agent computer, the marker file;

the watchdog waiting for a predetermined period of time, and then checking for the marker file;

in response to the marker file being deleted, restarting the state agent computer;

upon restarting, instantiating by the state agent computer the new binary file at the state agent computer, wherein only one copy of the new binary file is allowed to be upgraded, whereas separate configurations of the new binary file are allowed for each of the plurality of state agent computers, and wherein each of the plurality of state agent computers and the master agent computer are provided with an auto-upgrade even when the plurality of state agent computers are running on different physical locations;

providing a second state agent computer, wherein the state agent computer comprises a first configuration file, the second state agent computer comprises a second configuration file, wherein the first configuration file is different from the second configuration file, and wherein the master agent computer comprises a script file; and upon restart of the state agent computer and the second state agent computer, modifying, by the script file, the first configuration file and the second configuration file.

7. The method as defined in claim 6, wherein the new binaries are stored at a location defined by a configuration file modified before installing the new binaries.

8. The method as defined in claim 6, wherein the state agent is an NFS agent.

9. The method as defined in claim 6, wherein the state agent is a component of an enterprise manager system.

10. A non-transitory computer-readable medium having sets of computer-executable instructions stored thereon which, when executed by a computer, cause the computer to execute a method to install a software upgrade from a master agent to two or more state agents remotely located to and in communication with the master agent, the sets of instructions comprising:

instruction to store, at a shared location, a master agent computer comprising a binary file;

a state agent computer of a plurality of state agent computers, instruction to communicate with the master agent computer, wherein the state agent computer is at a remote location and wherein the state agent computer is operable to use the binary file from the shared location for execution, wherein the plurality of state agent computers are running at different physical locations;

instruction to receive, by the master agent computer, a new binary file to update the binary file at the shared location;

in response to receiving the new binary file, instruction to create a marker file by the master agent computer;

instruction to monitor, by a watchdog comprised on the state agent computer, the master agent computer for the presence of the marker file;

in response to the marker file being present at the master agent computer, instruction to stop execution of the state agent computer;

instruction to install, by the master agent computer, the new binary file;

in response to installing the new binary file, instruction to delete, by the master agent computer, the marker file;

the watchdog waiting for a predetermined period of time, and then instruction to check for the marker file;

in response to the marker file being deleted, instruction to restart the state agent computer;

upon restarting, instruction to instantiate by the state agent computer the new binary file at the state agent computer, wherein only one copy of the new binary file is allowed to be upgraded, whereas separate configurations of the new binary file are allowed for each of the plurality of state went computers, and wherein each of the plurality of state went computers and the master agent computer are provided with an auto-upgrade even when the plurality of state agent computers are running on different physical locations;

instruction to provide a second state agent computer, wherein the state agent computer comprises a first configuration file, the second state agent computer comprises a second configuration file, wherein the first configuration file is different from the second configuration file, and wherein the master agent computer comprises a script file; and upon restart of the state agent computer and the second state agent computer, instruction to modify, by the script file, the first configuration file and the second configuration file.

11. The non-transitory computer-readable medium as defined in claim 10, further comprising instructions to receive a confirmation from the two or more state agents that the two or more state agents have stopped executing.

12. The non-transitory computer-readable medium as defined in claim 10, further comprising determining if the installation of the software upgrade is complete;
- if the installation of the software upgrade is complete, deleting the marker file;
- if the installation of the software upgrade is not complete, waiting a predetermined period of time; and
- repeating the step of determining if the installation of the software upgrade is complete.

13. The non-transitory computer-readable medium as defined in claim 10, wherein the marker file is created in a predetermined location.

14. The non-transitory computer-readable medium as defined in claim 10, wherein the binary files for the software upgrade are stored in a different location from an original binary file;
- wherein the script file directs the state agent to use the binary files for the software upgrade from the different location to execute.

* * * * *

UNITED STATES PATENT AND TRADEMARK OFFICE
CERTIFICATE OF CORRECTION

PATENT NO. : 8,332,356 B2  
APPLICATION NO. : 12/464738  
DATED : December 11, 2012  
INVENTOR(S) : Thergaonkar et al.

Page 1 of 1

It is certified that error appears in the above-identified patent and that said Letters Patent is hereby corrected as shown below:

On Title page, Item [56] in column 2, under "Other Publications", line 14, delete "Kasersky" and insert -- Kaspersky --, therefor.

In the Claims:

In column 11, line 12-13, in Claim 1, delete "installs instantiates" and insert -- instantiates --, therefor.

In column 13, line 10, in Claim 10, delete "went" and insert -- agent --, therefor.

In column 13, line 11, in Claim 10, delete "went" and insert -- agent --, therefor.

Signed and Sealed this  
Twentieth Day of August, 2013

Teresa Stanek Rea  
*Acting Director of the United States Patent and Trademark Office*